(12) United States Patent
Jarrell

(10) Patent No.: US 8,449,746 B2
(45) Date of Patent: May 28, 2013

(54) SYSTEMS AND METHODS FOR COUPLING MOLECULE SEPARATION DEVICES TO ANALYTICAL INSTRUMENTS

(75) Inventor: Joseph A. Jarrell, Newton Highlands, MA (US)

(73) Assignee: Waters Technologies Corporation, Milford, MA (US)

( * ) Notice: Subject to any disclaimer, the term of this patent is extended or adjusted under 35 U.S.C. 154(b) by 59 days.

(21) Appl. No.: 13/178,041

(22) Filed: Jul. 7, 2011

(65) Prior Publication Data

US 2012/0168311 A1 Jul. 5, 2012

Related U.S. Application Data

(60) Provisional application No. 61/365,014, filed on Jul. 16, 2010.

(51) Int. Cl.
B01D 57/02 (2006.01)
H01J 49/00 (2006.01)
G01N 27/26 (2006.01)

(52) U.S. Cl.
USPC ............ 204/601; 250/288; 250/281; 422/924

(58) Field of Classification Search
USPC ............ 250/288, 281; 204/451, 601; 422/924
See application file for complete search history.

(56) References Cited

U.S. PATENT DOCUMENTS

| | | | |
|---|---|---|---|
| 6,140,640 A | 10/2000 | Wittmer et al. | |
| 7,544,932 B2 | 6/2009 | Janini et al. | |
| 2006/0057556 A1* | 3/2006 | Janini et al. | 435/4 |
| 2006/0060769 A1* | 3/2006 | Bousse et al. | 250/282 |

FOREIGN PATENT DOCUMENTS

WO  2008/089143  7/2008

OTHER PUBLICATIONS

NASA (NASA/TM-2007-214870).*
Settlage, Robert E., et al; A Novel μ-ESI Source for Coupling Capillary Electrophoresis and Mass Spectrometry: Sequence Determination of Tumor Peptides at the Attomole Level; J. Microcolumn Separations, 10(3) 281-285 (1998).
Issaq, Haleem J: et al; Sheathless electrospray ionizaiton interfaces for capillary electrophoresis-mass spectrometric detection Advantages and limitations; Journal of Chromatography A, 1053 (2004) 37-42.
Wallingford, Ross A.; "Development of Capillary Zone Electrophoresis for the Analysis of Neuronal Microenvironments", A Thesis in Chemistry, The Pennsylvania State Univewrsity, Department of Chemistry, dated Dec. 1988.
Hu, Shen, et al; "Annperonnetric Detection in Capillary Electrophoresis With An Etched Joint", Anal. Chem. 1997, 69, 264-267.

(Continued)

*Primary Examiner* — J. Christopher Ball
*Assistant Examiner* — Jennifer Dieterle
(74) *Attorney, Agent, or Firm* — Guerin & Rodriguez, LLP

(57) ABSTRACT

Described is a capillary that interfaces with an analysis system. The capillary comprises a non-conductive tubing and a conductive region proximate to an output end of the non-conductive tubing. The conductive region comprises a plurality of porous regions and non-porous regions positioned about a circumference of the non-conductive tubing. The porous regions separated from each other by the non-porous regions. Advantageously, the arrangement of porous regions provides mechanical stability about the conductive region.

18 Claims, 5 Drawing Sheets

OTHER PUBLICATIONS

Wallingford, Ross A., et al; "Amperometric detection of catechols in capillary zone electrophoresis with normal and micellar solutions" Anal. Chem., 1988, 60 (3), 258-263.

Sanz-Nebot, Victoria, et al; "Comparison of sheathless and sheath-flow electrospray interfaces for the capillary electrophoresis-electrospray ionization-mass spectrometry analysis of peptides"; Electrophoresis 2005, 26, 1457-1465.

Wallingford, Ross A., et al; "Capillary zone electrophoresis with electrochemical detection"; Anal. Chem., 1987, 59 (14), 1762-1766.

Whang, Chen Wen, et al; "Cellulose acetate-coated porous polymer joint for capillary zone electrophoresis"; Anal. Chem., 1992, 64 (20), 2461-2464.

Leinweber, Felix C., et al; "Sheathless electrospray ionization directly from a capillary monolith for fast liquid chromatography coupled to Fourier transform ion cyclotron resonance mass spectrometry"; J. Mass Spectrom. 2004; 39; 223-225.

Whitt, Jacob T., et al; "Capillary Electrophoresis to Mass Spectrometry Interface Using a Porous Junction"; Anal. Chem. 2003, 75, 2188-2191.

Moini, Mehdi, et al; Simplifying CE-MS Operation. 2. Interfacing Low-Flow Separation Techniques to Mass Spectrometry Using a Porous Tip; Anal Chem. 2007, 79, 4241-4246.

Huang, Xiaohua, et al; Use of an on-column frit in capillary zone electrophoresis: sample collection; Anal. Chem., 1990 61 (5), 443-446.

Janini, George M.; "A Sheathless Nanoflow Electrospray Interface for On-Line Capillary Electrophoresis Mass Spectrometry"; Anal. Chem., 2003, 75 (7), 1615-1619.

Janini, George M.; On-Column Sample Enrichment for Capillary Electrophoresis Sheathless Electrospray Ionization Mass Spectrometry: Evaluation for Peptide Analysis and Protein Identificaiton; Anal. Chem., 2003, 75 (21), 5984-5993.

Issaq, Haleem J., et al; Sheathless electrospray ionization interfaces for capillary electrophoresis-mass spectrometric detecion Advantages and limitations; Journal of Chromatography A, 1053 (2004) 37-42.

\* cited by examiner

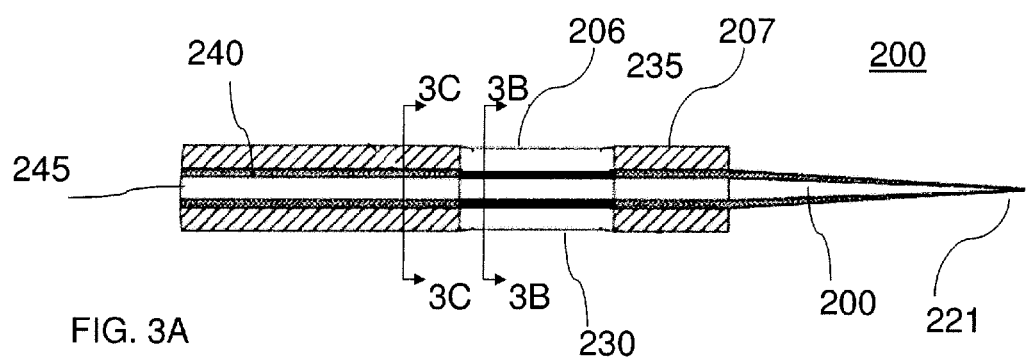
FIG. 3A
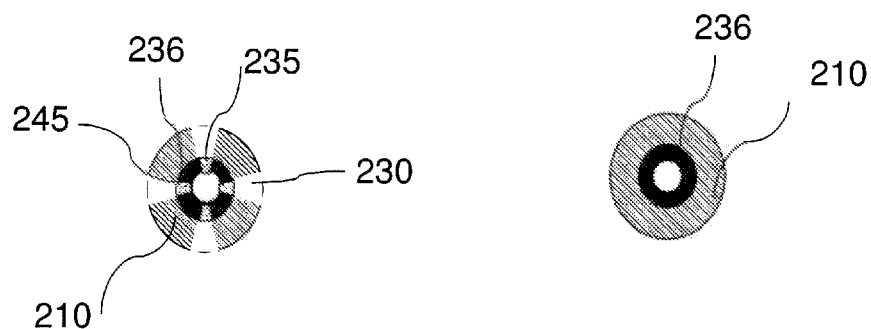
FIG. 3B
FIG. 3C

SYSTEMS AND METHODS FOR COUPLING MOLECULE SEPARATION DEVICES TO ANALYTICAL INSTRUMENTS

CROSS REFERENCE TO RELATED APPLICATIONS

This application claims benefit of U.S. Provisional Application No. 61/365,014 filed Jul. 16, 2010 the content of which is incorporated herein by reference.

FIELD OF THE INVENTION

The present inventive concepts relate generally to systems and methods for coupling a molecule separation device to an analytical instrument. In particular, the present inventive concepts relate to an improved sheathless interface coupled between a capillary electrophoresis apparatus and a mass spectrometer.

BACKGROUND

Capillary electrophoresis (CE) is a well-known technique for separating molecules, compounds, and the like, in a sample with high efficiency. Capillary electrophoresis is generally performed by a CE instrument that introduces a sample comprising analyte molecules of interest to a narrow-diameter capillary. The CE instrument applies a voltage across the length of the capillary, causing electroosmotic and electrophoretic movement of the analyte molecules in the capillary. The analyte molecules are separated, and later identified, according to differences in electrophoretic mobility, molecule size, or other properties.

The CE instrument can be coupled to an analytical instrument, such as a mass spectrometer, that identifies and analyzes complex mixtures and compounds provided in the sample. These configurations generally require an electrospray ionization (ESI) procedure to be performed. ESI produces ions from highly charged liquid droplets comprising the analyte molecules by an electric field produced near the outlet of the capillary. The ionized analyte molecules are subsequently output from the capillary to the mass spectrometer.

Separation and ionization techniques performed in the capillary preferably maximize sensitivity and resolution of the sample, resulting in better detection and analysis by the mass spectrometer.

SUMMARY

In accordance with one aspect, the present inventive concepts feature a capillary for interfacing with an analysis system that includes a non-conductive tubing and a conductive region proximate to an output end of the non-conductive tubing. The conductive region includes porous regions and non-porous regions positioned about a circumference of the non-conductive tubing. The porous regions are separated from each other by the non-porous regions.

In accordance with another aspect, the present inventive concepts feature a CE apparatus. The CE apparatus includes a capillary for receiving a sample. An outer surface of the capillary includes a non-porous material. The CE apparatus also includes an analysis system interface proximate to an output end of the capillary. The analysis system interface includes a conductive region extending from the output end of the capillary. The conductive region includes a plurality of porous regions, each separated from the other porous regions by the non-porous material.

In accordance with another aspect, the present inventive concepts feature a method of forming a sheathless capillary electrophoresis-mass spectrometer (CE-MS) interface. The method includes forming a plurality of openings in an etchant-resistant outer layer of a capillary proximate to an output end of the capillary. The openings are spaced about a circumference of the etchant-resistant outer layer. A plurality of porous regions is formed in an inner layer of the capillary and is in spatial registration with the openings.

BRIEF DESCRIPTION OF THE DRAWINGS

The above and further advantages of the inventive concepts may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

FIG. 3A is a cross-sectional side view of the capillary illustrated in FIG. 2.

FIG. 3B is a cross-sectional front view of the capillary illustrated in FIG. 2.

FIG. 3C is another cross-sectional front view of the capillary illustrated in FIG. 2.

DETAILED DESCRIPTION

Reference in the specification to "one embodiment" or "an embodiment" means that a particular, feature, structure or characteristic described in connection with the embodiment is included in at least one embodiment of the teaching. The appearances of the phrase "in one embodiment" in various places in the specification are not necessarily all referring to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Figure 1:
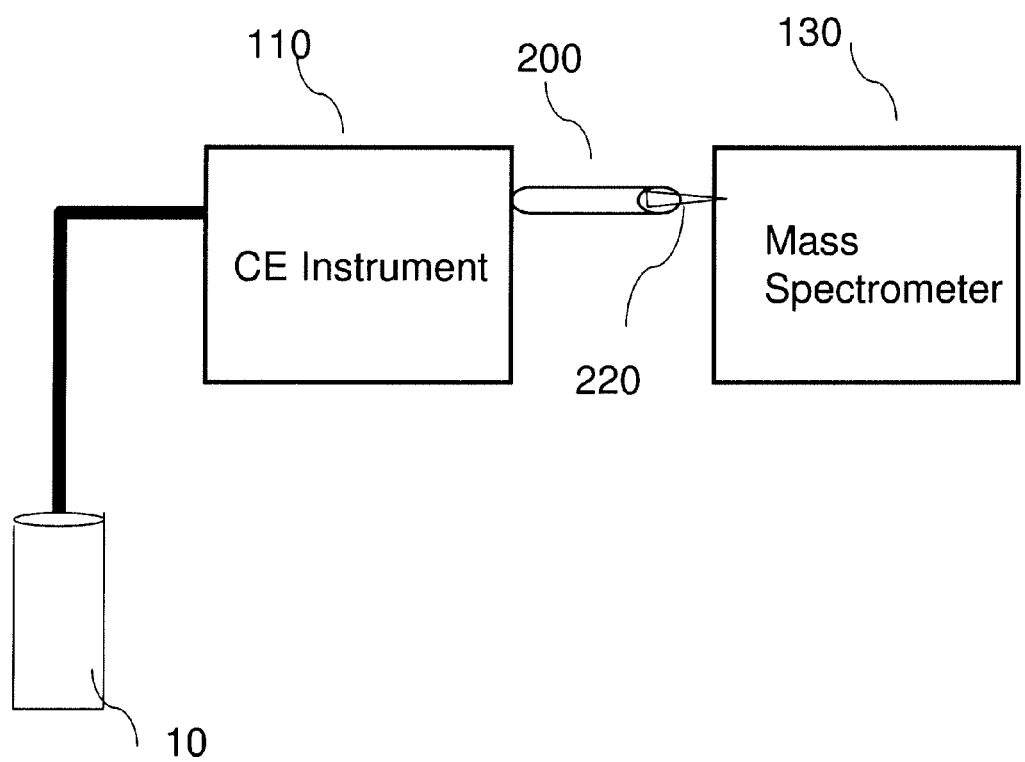
FIG. 1 is a block diagram of an embodiment of a CE instrument in communication with a mass spectrometer (MS) by a capillary having a CE-MS interface, in accordance with aspects of the present inventive concepts.

FIG. 1 is a block diagram of an embodiment of a capillary electrophoresis (CE) instrument 110 in communication with a mass spectrometer (MS) 130 through a capillary 200. A sample 10 is introduced through an inlet at an input end region of the capillary 200. The sample 10 can include a fluid mixture comprising one or more liquids which are composed of analyte molecules, or analytes. The fluid mixture further comprises an electrolyte solution, in which the analyte molecules, which for example may exist as ions in solution, can be provided for delivery along the length of the capillary 200 to an output end region, and to the mass spectrometer 130 from a capillary tip 220 at the outermost end of the output end region.

Prior to delivery to the mass spectrometer 130 for high quality detection and analysis, the analyte molecules are separated from each other by the CE instrument 110, and ionized at a CE-MS interface of the capillary 200. In particular, the molecules are separated by an electric field that is applied across at least a portion of the length of the capillary 200 via electrodes at the input and output end regions, respectively, thereby generating electroosmotic flow that moves the sample through the capillary 200. The analyte molecules and other components in the sample 10 can be separated from each other according to differences in electrophoretic mobility, molecule size, or other properties.

The analyte molecules in the sample 10 can also be ionized prior to delivery to the mass spectrometer 130. Analyte ionization is achieved, for example, by an ESI procedure applied at a CE-MS interface proximate to the capillary tip 220. A voltage is applied by a voltage source (not shown) to the sample at the CE-MS interface. Accordingly, the sample 10 is converted into a spray comprising a plurality of charged analyte molecules that is delivered to the mass spectrometer 130. The voltage source can be the same voltage source that is used to separate the molecules or an independent voltage source.

In order for the ionized analyte molecules to be generated, a suitable electrical connection is provided at the CE-MS interface between the CS instrument 110 and the mass spectrometer 130.

In one approach, a sheath-flow interface is provided, for example, as described in U.S. Pat. No. 5,423,964 issued to Smith et al., incorporated herein by reference in its entirety. The sheath-flow interface is usually located at an outlet end of a non-conductive capillary, and provides a voltage via a conductive liquid, referred to as a sheath liquid, to the outlet end. The sheath liquid includes an electrolyte that provides a suitable electrical connection at the capillary where analyte ionization occurs. However, the sheath-liquid interface has several shortcomings, including low sensitivity arising from dilution of the analytes in the sheath liquid.

In another approach, a sheathless interface is provided that allows analytes in a sample to be ionized without diluting the analytes with the sheath liquid. Typical sheathless configurations include a single contiguous porous region at the CE-MS interface, wherein the analytes are ionized via the porous region. Examples of this approach can be found in U.S. Pat. No. 7,544,932, issued to Janini et al. and PCT Publication No. WO 2008/089143, incorporated herein by reference in their entireties. However, the porous region of a sheathless interface, which is positioned about the circumference of the capillary, generally has a thickness that is less than a thickness of the non-porous capillary tubing, rendering the porous region mechanically fragile. Accordingly, the capillary can be easily damaged during operation.

The present inventive concepts address and overcome the limitations associated with conventional CE-MS interfaces. In particular, the present inventive concepts include devices and methods for coupling a CE instrument, wherein analyte molecules of a sample can be detected and analyzed with high sensitivity and resolution.

The devices include a capillary having porous regions and non-porous regions circumferentially positioned about an electrically conductive region that is proximate to an output end region of the capillary. The porous regions and non-porous regions are constructed and arranged such that that the capillary has a sufficient porosity to permit a voltage to be applied to separate and/or ionize the analyte molecules delivered through the capillary, while providing improved mechanical strength and stability to the conductive region of the capillary relative to conventional sheathless capillary configurations.

Figure 2:
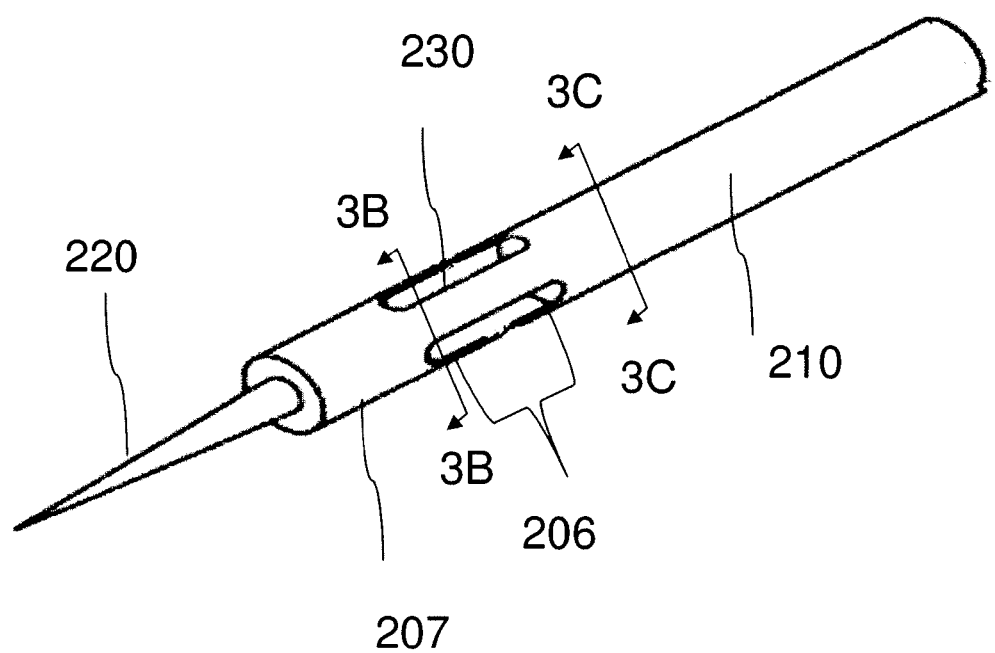
FIG. 2 is an illustration of an embodiment of a capillary of a CE instrument, in accordance with aspects of the invention.

FIG. 2 is an illustration of an embodiment of a capillary 200 of a CE instrument, in accordance with aspects of the invention. FIG. 3A is a cross-sectional side view of the capillary 200 illustrated in FIG. 2. FIG. 3B is a cross-sectional front view of the capillary 200 illustrated in FIG. 2. FIG. 3C is another cross-sectional front view of the capillary 200 illustrated in FIG. 2.

The capillary 200, also referred to as a CE capillary, can be coupled between a CE instrument and a mass spectrometer, for example, the CE instrument 110 and mass spectrometer 130 illustrated in FIG. 1. In other embodiments, the capillary 200 can be coupled to other detection and/or analysis instruments that perform techniques such as chromatography, for example, liquid chromatography, or other separation techniques.

The capillary 200 includes a capillary tubing 240 that extends along the length of the capillary 200. The capillary tubing 240 can be formed of fused silica, plastic, glass, or non-conductive materials, polymers, or composites known to those of ordinary skill in the art that permit the formation of a unitary narrow-bore tube. A contiguous fluid path 245 extends through the tubing 240 from an inlet at an input end region of the capillary 240 to an outlet 221 at an outermost end of the capillary 200. While outlet 221 is shown in FIGS. 1-3 as having both internal and internal tapers, in other embodiments, the outlet can have different configurations, which do not include tapers, or which include either an internal taper or an external taper.

Most of the capillary tubing 240 is non-porous and therefore prevents analytes in a sample from permeating or otherwise penetrating the wall of the tubing 240. As described herein, the capillary tubing 240 also includes porous regions 235 circumferentially positioned about one or more conductive regions of the capillary 200.

The capillary 200 can include a CE-MS interface having a conductive region 206 to which a voltage is applied, for example, to perform electrospray ionization (ESI) and/or electrophoresis. The conductive region 206 is preferably positioned to be proximate to an output end region 206 of the non-conductive tubing 240, and interfaces between the capillary 200 and an analysis instrument, such as mass spectrometer 130 shown in FIG. 1. In other embodiments, one or more conductive regions are positioned along other sections of the capillary 200, for example, proximate to an input end region of the capillary 200. The porous regions 235 and non-porous regions 236 are circumferentially positioned about the conductive region 206, wherein the porous regions 235 are separated from each other by the non-porous regions 236 as shown in FIG. 3B.

The porous regions 235 can be formed by etching the non-conductive tubing 240. Therefore, the porous regions 235 of the tubing 240 can have a thickness between the fluid path 245 and the outer surface of the tubing 240 that is less than a thickness of corresponding non-porous regions 236 of the tubing 240. The porous regions 235 permit a voltage to be applied to the conductive region 206 for separating analytes in the fluid path 245 of the tubing 240, and/or for ionizing analytes exiting the tubing 240.

The pores in the tubing 240 are formed in a manner to at least partially block analytes from flowing out of the tubing 240 while permitting electrolyte ions, for example, from an ESI needle, to pass through for adequate electrical conductivity. The porous regions 235 are circumferentially positioned about the conductive region 206 in a manner that maintains the mechanical strength of the capillary 200. In one embodiment, the porous regions 235 and non-porous regions 236 are equally spaced with respect to each other about the circumference of the conductive region 206. In other embodiments, the porous regions 235 are separated at different distances from each other.

The capillary 200 further includes a protective outer layer 210 on the capillary tubing 240. The protective outer layer 210 can comprise polyimide or other material that protects the tubing 240 from damage.

The protective outer layer 210 includes a plurality of openings 230 corresponding to the porous regions 235 in the conductive region 206. A power supply source (not shown) can apply a voltage to the conductive region 206 via the openings 230, for example, by a conductive fluid between an external electrode and the sample in the capillary 200.

In one embodiment, the porous regions 235 have a shape and size that are similar to the shape and size of corresponding openings 230 in the protective outer layer 210. The openings 230 extend through the protective outer layer 210 to expose the porous regions 235. For example, the porous regions 235 and/or openings 230 can be slot-shaped, circular, or otherwise shaped to permit a voltage to be applied to the capillary 200 to separate and/or ionize analytes. Each porous region 235 can be of the same shape and size, or of different shapes and sizes, as the other porous regions or the openings 230.

As described above, the porous regions 235 of the electrically conductive region 206 can permit an electrophoresis voltage to be provided along the capillary to separate analyte molecules of interest, which are present in a conductive solution in the capillary 200 when an electric field is applied to the sample. The electric field can be formed in the capillary 200 between a first electrode positioned at the conductive region 206 and a second electrode positioned at or proximate to the input end region of the capillary. In other embodiments, a spray voltage can be provided to the conductive region 206 for electrospray ionization of the sample. Optionally, both an electrophoresis voltage and an electrospray voltage is applied to the conductive region 206. In one embodiment, the conductive region 206 includes two or more conductive regions along the capillary 200, which are separate from each other. An electrophoresis voltage is applied to the first conductive region and an electrospray voltage is applied to the second conductive region.

In one embodiment, a tip 220 is coupled to the output end region 207 of the capillary 200. The tip 220 can be formed separately from the capillary 200, and coupled to the capillary 200. Alternatively, the tip 220 is formed from the output end region 207 of the capillary 200. The tip 220 can be an electrospray tip, wherein an electrospray containing analyte ions is output from the electrospray tip to an instrument, for example, a mass spectrometer. The tip 220 can have a fluid path diameter that is the same as the diameter of the fluid path 245 of the capillary tubing 240. Alternatively, the fluid path through the tip 200 can be tapered.

Figure 4:
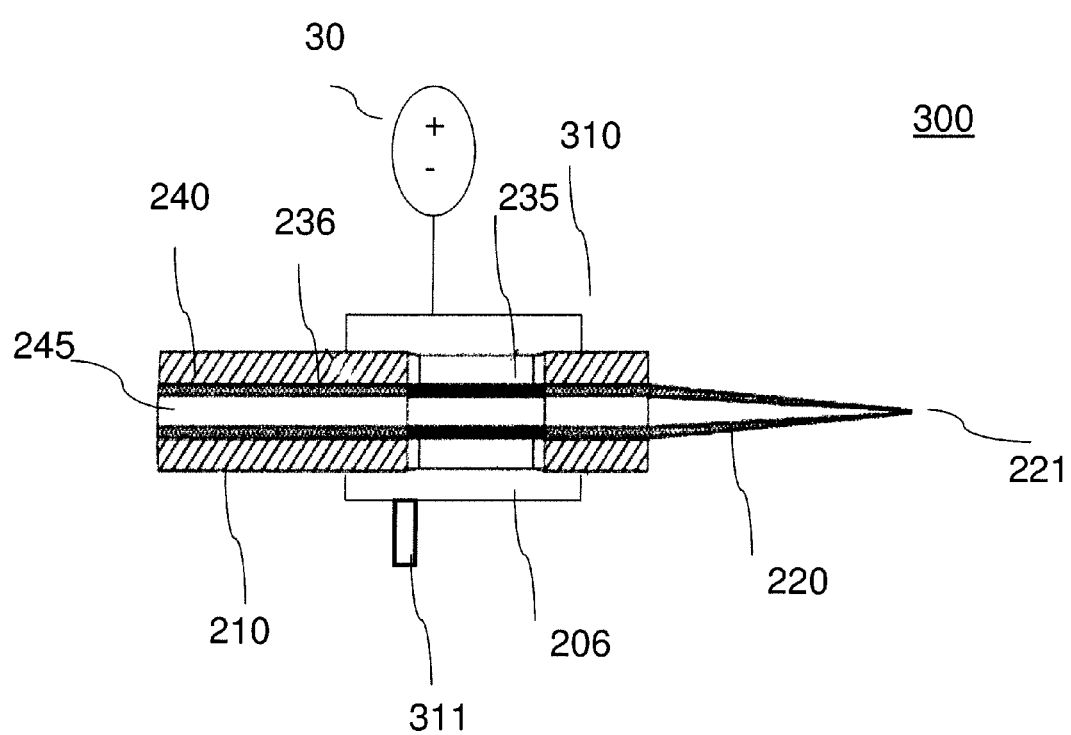
FIG. 4 is a cross-sectional side view of an embodiment of a capillary including an external sheath, in accordance with aspects of the present inventive concepts.

FIG. 4 is a cross-sectional side view of an embodiment of a capillary 300 including an external sheath 310 filled with a conductive fluid, in accordance with aspects of the present inventive concepts. The capillary 300 can be similar to the capillary 200 described with reference to FIGS. 2 and 3A-3C. The capillary 300 includes a conductive region 206 having a plurality of porous regions 235, which are separated from each other by a non-porous material forming the bulk of the capillary 300.

The external sheath 310 is positioned about the conductive region 206 near the tip 220 of the capillary 300, and allows a voltage to be applied to a sample in the fluid path 245 via the porous regions 235, for example, similar to the approach described in PCT Publication No. WO 2008/089143. The external sheath 310 can be formed of a conductive material, such as stainless steel.

The external sheath 310 is at least partially filled with a conductive fluid, for example, a background electrolyte (BGE), which is supplied to the porous regions 235 via an inlet 311. The conductive fluid permits a voltage to be applied to the conductive region 206 from a voltage source 30. The voltage can be an electrospray voltage, applied to the conductive region 206 to produce an electrospray comprising ionized analytes, which are output from the tip 220 to an instrument such as a mass spectrometer.

The voltage source 30 can apply an electrospray voltage to the conductive region 206 to produce an electrospray comprising ionized analytes that are outputted from the tip 220 to an instrument such as a mass spectrometer.

The voltage source 30 or a second voltage source can provide an electrophoresis voltage along the capillary 300 to separate fluid sample components from each other. The electrophoresis voltage is applied to an electrode at the conductive region 206 and an electrode that is in electrical contact with the sample upstream from the conductive region 206, for example, proximate to the input end region of the capillary 300. In this manner, an electric field is formed between the conductive region 206 and the input end region of the capillary to separate analyte molecules from each other. In other embodiments, the electrophoresis voltage is applied to an electrode in electrical contact with the sample downstream from the conductive region 206.

Figure 5:
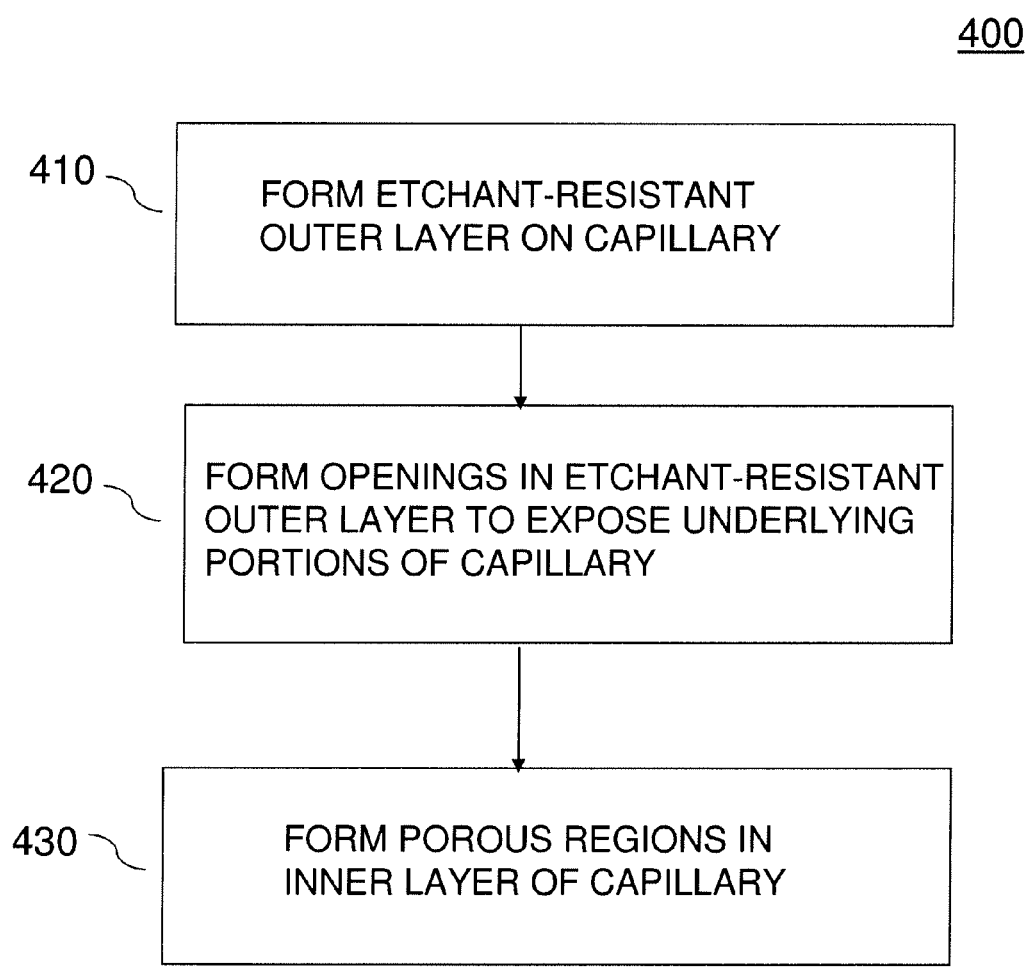
FIG. 5 is a flow diagram of a method of forming a sheathless interface, in accordance with aspects of the present inventive concepts.

FIG. 5 is a flow diagram of a method 400 of forming a sheathless interface in accordance with aspects of the present inventive concepts. The sheathless interface can be a CE-MS interface, for example, as described in FIGS. 1-4.

The method 400 is applied to a narrow-bore capillary tubing that can comprise fused silica, plastic, and/or glass, or other non-conductive materials, polymers, or composites.

According to the method 400, a protective outer layer is formed (step 410) about the capillary tubing. The protective outer layer can include polyimide or other etchant-resistant material. In one embodiment, the outer layer protects the tubing from damage. The outer layer can be a photoresist that is deposited on the capillary tubing prior to the formation of porous regions and the photoresist is removed after the porous regions are formed.

A plurality of openings are formed (step 420) in the protective outer layer. A laser beam is used to selectively remove portions of the outer layer circumferentially positioned about a region of the capillary tubing. Alternatively, other techniques can be used to selectively remove portions of the protective outer layer to expose underlying regions of the capillary tubing to be etched, or otherwise modified to be porous. The openings can be slot-shaped, cylindrical, or have a shape that permits the sample in the capillary tubing to receive a voltage from a voltage source. The openings in the protective outer layer can be equidistant from each other about one or more circumferential regions of the capillary tubing, or the openings can be separated from each other at varying distances.

The porous regions of the capillary tubing are formed (step 430) by etching portions of the outer surface of the capillary tubing exposed by the openings in the outer layer. This can be achieved by rendering the material in the capillary tubing (e.g., fused silica) porous by selective or controlled etching. Hydrofluoric acid (HF) can be used as an etchant; however, other etchants can be used that are known to those of ordinary skill in the art. In this manner, regions of the capillary tubing are selected for etching to preserve the mechanical strength of the capillary tubing despite the formation of the porous regions. This can be achieved by forming porous regions about a circumferential region of the tubing, such that the porous regions are separated from each other by non-porous sections of the capillary tubing.

Alternatively, any method can be applied which can locally remove material from the outside of the capillary tubing. Subsequently, etching can be performed to remove material from those local regions to render them porous. While some material will also be removed from around these local regions, the resultant structure will still be mechanically stronger than those produced according to conventional approaches.

While embodiments of the capillary have been described with respect to capillary electrophoresis and analyte ionization, the capillary is not limited to such applications. Other applications are contemplated where a fluid sample is delivered through a narrow-bore capillary for detection and/or analysis, for example, applications related to liquid chromatography.

While the invention has been shown and described with reference to specific embodiments, it should be understood by those skilled in the art that various changes in form and detail may be made therein without departing from the spirit and scope of the invention as recited in the accompanying claims.

What is claimed is:

1. A capillary electrophoresis (CE) apparatus comprising:
    a capillary for receiving a sample, an outer surface of the capillary comprising a non-porous material; and
    an analysis system interface proximate to an output end of the capillary, the analysis system interface comprising a conductive region extending from the output end of the capillary, the conductive region comprising a plurality of non-contiguous porous regions, each of the porous regions separated from the other non-contiguous porous regions by the non-porous material.

2. The apparatus of claim 1 further comprising a protective outer layer disposed on the capillary and the analysis system interface.

3. The apparatus of claim 2, wherein the protective outer layer includes a plurality of openings in spatial alignment with the plurality of non-contiguous porous regions.

4. The apparatus of claim 3, wherein the protective outer layer includes a polyimide layer.

5. The apparatus of claim 1, wherein the analysis system interface includes an electrospray tip that receives the ionized molecules from the capillary.

6. The apparatus of claim 1, wherein the capillary comprises a fused silica tubing.

7. A capillary having a capillary electrophoresis-mass spectrometer (CE-MS) interface for interfacing with an analysis system comprising:
    a non-conductive tubing; and
    a conductive region proximate to an output end of the non-conductive tubing, the conductive region comprising a plurality of non-contiguous porous regions and non-porous regions positioned about a circumference of the non-conductive tubing, the non-contiguous porous regions separated from each other by the non-porous regions.

8. The capillary of claim 7 further comprising a protective outer layer.

9. The capillary of claim 8, wherein the protective outer layer includes a polyimide layer.

10. The capillary of claim 7, wherein the output end comprises a spray tip that receives ionized molecules from the non-conductive tubing.

11. The capillary of claim 7, wherein the non-conductive tubing comprises fused silica.

12. A method of forming a sheathless capillary electrophoresis-mass spectrometer (CE-MS) interface, the method comprising:
    forming a plurality of openings in an etchant-resistant outer layer of a capillary proximate to an output end of the capillary, the openings being spaced about a circumference of the etchant-resistant outer layer; and
    forming a plurality of non-contiguous porous regions in an inner layer of the capillary and in spatial alignment with the plurality of openings.

13. The method of claim 12, wherein the non-contiguous porous regions are formed by etching the inner layer of the capillary through the openings in the etchant-resistant outer layer.

14. The method of claim 13, wherein the etching is performed by applying hydrofluoric acid to the inner layer of the capillary through the openings in the etchant-resistant layer.

15. The method of claim 12, wherein the etchant-resistant outer layer comprises polyimide.

16. The method of claim 12, wherein the etchant-resistant outer layer is a photoresist deposited on the capillary that exposes portions of the outer surface of the capillary to be etched.

17. The method of claim 12, wherein the capillary comprises a fused silica tubing.

18. The method of claim 12, wherein the openings in an etchant-resistant outer layer are formed by a laser beam.

* * * * *